US 7,990,554 B2

(12) United States Patent
Watanabe (10) Patent No.: US 7,990,554 B2
(45) Date of Patent: Aug. 2, 2011

(54) IMAGE REPRODUCING APPARATUS THAT SELECTS A PRINTING APPARATUS VIA RADIO COMMUNICATION

(75) Inventor: Gaku Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1288 days.

(21) Appl. No.: 10/886,569

(22) Filed: Jul. 9, 2004

(65) Prior Publication Data

US 2005/0012958 A1 Jan. 20, 2005

(30) Foreign Application Priority Data

Jul. 15, 2003 (JP) .................................. 2003-197198

(51) Int. Cl.
*G06F 3/12* (2006.01)

(52) U.S. Cl. ....................... 358/1.15; 358/1.14; 358/1.13; 348/207.1; 348/207.2; 713/320

(58) Field of Classification Search ................. 358/1.15, 358/1.14, 1.13; 713/320; 348/207.2, 207.1
See application file for complete search history.

(56) References Cited

U.S. PATENT DOCUMENTS

| | | | | |
|---|---|---|---|---|
| 5,014,221 A | * | 5/1991 | Mogul | 358/1.14 |
| 5,790,876 A | * | 8/1998 | Shima et al. | 713/320 |
| 6,115,137 A | * | 9/2000 | Ozawa et al. | 358/1.6 |
| 6,131,167 A | * | 10/2000 | Cruz | 713/320 |
| 6,282,665 B1 | * | 8/2001 | Cruz | 713/320 |
| 6,715,003 B1 | * | 3/2004 | Safai | 710/33 |
| 6,931,555 B2 | * | 8/2005 | Osborn | 713/320 |
| 7,327,387 B2 | * | 2/2008 | Tanaka et al. | 348/207.99 |
| 2001/0048535 A1 | * | 12/2001 | Usami | 358/1.18 |
| 2002/0021902 A1 | * | 2/2002 | Hosoda et al. | 396/429 |
| 2002/0090910 A1 | * | 7/2002 | Takemura | 455/3.05 |
| 2002/0137544 A1 | * | 9/2002 | Myojo | 455/557 |
| 2003/0025796 A1 | * | 2/2003 | Yamagishi | 348/207.2 |
| 2003/0025808 A1 | * | 2/2003 | Parulski et al. | 348/231.99 |
| 2003/0084105 A1 | * | 5/2003 | Wiley et al. | 709/205 |

FOREIGN PATENT DOCUMENTS

| | | |
|---|---|---|
| JP | 2002-033861 | 1/2002 |
| JP | 2002033861 A * | 1/2002 |

* cited by examiner

*Primary Examiner* — Chan S Park
*Assistant Examiner* — Jacky X Zheng
(74) *Attorney, Agent, or Firm* — Fitzpatrick, Cella, Harper & Scinto (57) ABSTRACT

In an image reproducing apparatus according to the present invention, image printing apparatuses capable of performing radio communication are sought, and service information relating to contents of image printing services provided by image printing apparatuses so detected is received from the plurality of image printing apparatuses. Information relating to the contents of the image printing services of the detected plurality of image printing apparatuses is displayed based on the received service information. An arbitrary one of the displayed plurality of image printing apparatuses is selected by the user, and the image data reproduced from a recording medium is transmitted to the selected image printing apparatus.

4 Claims, 5 Drawing Sheets

IMAGE REPRODUCING APPARATUS THAT SELECTS A PRINTING APPARATUS VIA RADIO COMMUNICATION

BACKGROUND OF THE INVENTION

1. Field of the Invention

The present invention relates to an image reproducing apparatus. More particularly, the invention relates to a technique for reproducing image data, and outputting the reproduced image data using an image-data output apparatus, such as a printer, or the like, possessed by a service provider.

2. Description of the Related Art

Conventionally, to print images recorded in a digital camera by the camera's user, the general practice has been to print the images by bringing a recording medium of the digital camera to a shop that provides image printing service, as described in Japanese Patent Application Laid-Open (Kokai) No. 2002-33861. In contrast to an on-line printing order through the Internet, it is desirable to obtain promptly the result of printing because it is normal that the user receives the result of printing directly from the shop.

However, the above-described image printing service has the following problems.

First, since there are a large number of shops to provide image printing services, particularly in urban regions, competition between the shops is hard, and differentiation among services is effected in terms of printing times, printing charges and printing methods. However, since the user must confirm the contents of the services offered by directly visiting the shop, it is difficult to compare the contents of services of a plurality of shops. In addition, there is no means for easily finding nearby service providers in an intricate urban region.

Furthermore, when receiving a print service, since a recording medium of the digital camera is deposited in a shop when ordering the service, it is impossible to perform a photographing operation until the recording medium is returned if the user has no spare recording medium, and after ordering the service, the user must go and receive prints while worrying about the delivery time of the print service.

SUMMARY OF THE INVENTION

It is an object of the present invention to solve the above-described problems.

It is another object of the present invention to allow a user to receive a service without performing a troublesome operation to find a service provider and without depositing a recording medium in which image data has been recorded with the service provider.

It is still another object of the present invention to allow a user to receive a desired service with respect to output of image data, by comparing the contents of services of two or more providers.

It is yet another object of the present invention to allow a user to await delivery without worrying about a delivery time.

According to one aspect of the present invention, a reproducing apparatus includes reproducing means for reproducing image data from a recording medium, communication means for performing data communication by means of radio communication, control means for controlling the communication means so as to find image printing apparatuses capable of performing radio communication with the reproducing apparatus, and to receive service information relating to contents of image printing services provided by the image printing apparatuses so detected, display means for displaying information relating to the contents of the image printing services of the detected plurality of image printing apparatuses, based on the received service information, and transmission-destination selection means for use by a user in selecting an arbitrary one of the plurality of image printing apparatuses displayed on the display means. The control means controls the communication means so as to transmit the image data reproduced by the reproducing means to the image printing apparatus selected by the transmission-destination selection means.

According to another aspect of the present invention, a reproducing apparatus includes reproducing means for reproducing image data from a recording medium, communication means for performing data communication by means of radio communication, retrieval means for finding image printing apparatuses capable of performing radio communication with the reproducing apparatus, transmission-destination selection means for use by a user in selecting an arbitrary one of the image printing apparatuses so detected by the retrieval means, and control means for controlling the communication means so as to transmit the image data reproduced by the reproducing means to the image printing apparatus selected by the transmission-destination selection means, and receive delivery information indicating an estimated delivery time of printed matter from the selected image printing apparatus.

According to still another aspect of the present invention, an image printing system includes an image reproducing apparatus and an image printing apparatus. The image reproducing apparatus includes reproducing means for reproducing image data from a recording medium, communication means for performing data communication by means of radio communication, control means for controlling the communication means so as to find image printing apparatuses capable of performing radio communication with the reproducing apparatus, and to receive service information relating to contents of image printing service provided by image printing apparatuses so detected, display means for displaying information relating to the detected plurality of image printing apparatuses, based on the received service information, and transmission-destination selection means for a user to employ in selecting an arbitrary one of the plurality of image printing apparatuses displayed on the display means. The control means controls the communication means so as to transmit the image data reproduced by the reproducing means to the image printing apparatus selected by the transmission-destination selection means. The image printing apparatus receives the image data transmitted from the image reproducing apparatus, and prints an image represented by the image data.

The foregoing and other objects, advantages and features of the present invention will become more apparent from the following detailed description of the preferred embodiment taken in conjunction with the accompanying drawings.

DETAILED DESCRIPTION OF THE PREFERRED EMBODIMENT

A preferred embodiment of the present invention will now be described with reference to the drawings.

Figure 1:
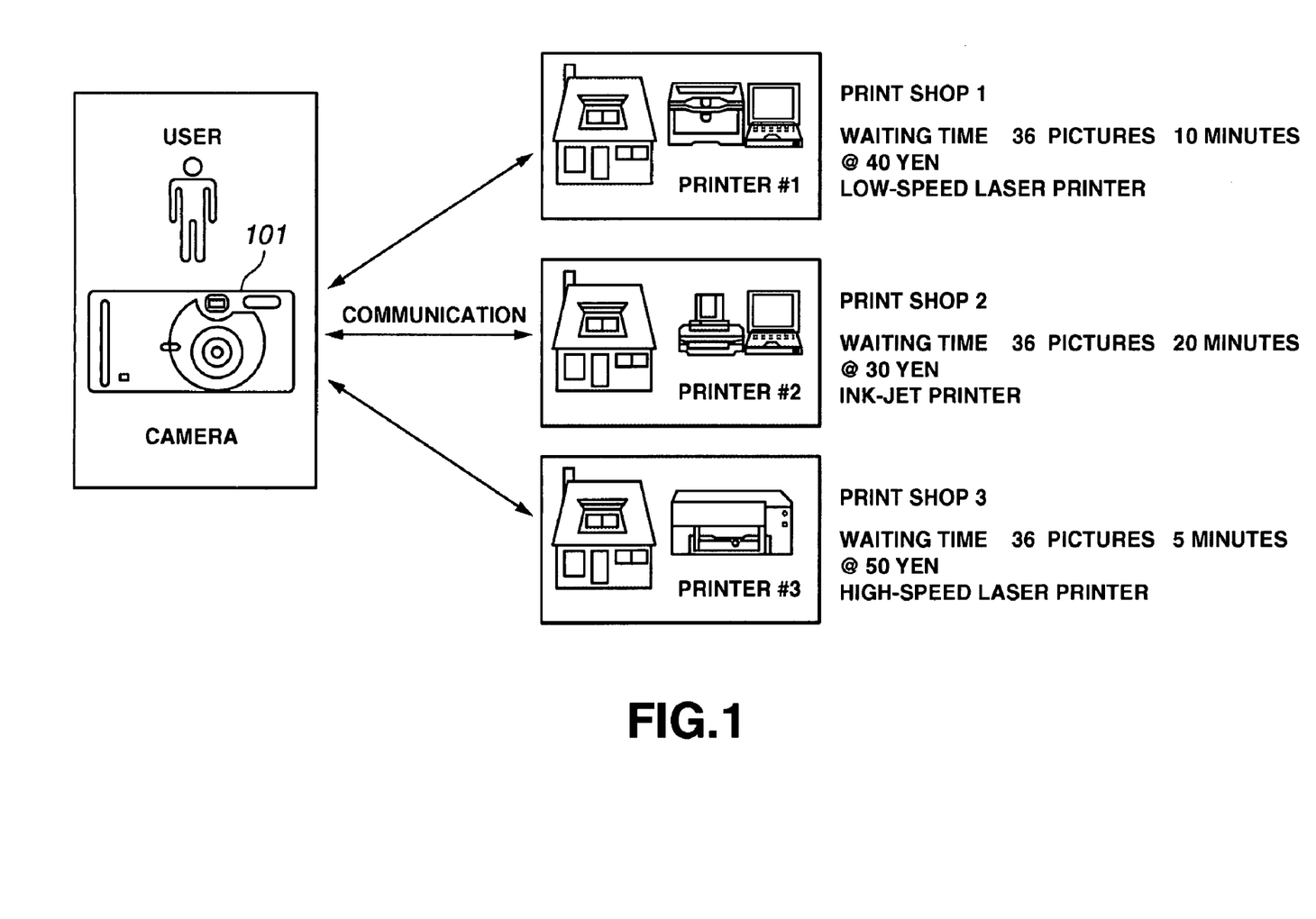
FIG. 1 is a schematic diagram illustrating the configuration of an image printing service system according to a preferred embodiment of the present invention.

First, the contents of services that can be provided by an image printing service system according to this embodiment will be described with reference to FIG. 1. FIG. 1 is a schematic diagram illustrating the configuration of the image printing service system of the embodiment.

In FIG. 1, a user that utilizes this system records images using a camera 101. When intending to print recorded images, the user turns on the power supply of the camera 101. Then, the camera 101 retrieves image printing service providers with which a radio communication apparatus incorporated within the camera 101 can communicate within a radio communication arrival distance.

In the case shown in FIG. 1, there exist three image printing service providers, i.e., print shop 1, print shop 2, and print shop 3, around the user and the camera 101. Each of the image printing service providers that execute image printing service has a radio apparatus and a printing apparatus, and can communicate with the camera 101.

The user selects one of the three image printing service providers displayed in the camera 101. The waiting time, charges for printed images, and printing method are taken into consideration for selection. Then, the user selects images to be printed, and transmits the data of the selected images to the selected image printing service provider using radio communication means. Upon completion of transmission, the image printing service provider transmits an exact estimated delivery time to the camera 101.

The camera 101 also transmits data for identifying the order placer (the camera user) to the image printing service provider. The ordering operation is thereby terminated. The camera 101 notifies the user of fulfillment of the delivery time at the predicted time of end of a printing operation. Then, the user goes to the shop of the image printing service provider, receives the printed images, and pays the charge.

According to such image printing service, the user can select and order an optimum image printing service without directly visiting the shop of the provider. It is also possible to receive easily printed images without wasting time and without depositing/receiving a recording medium.

Figure 5:
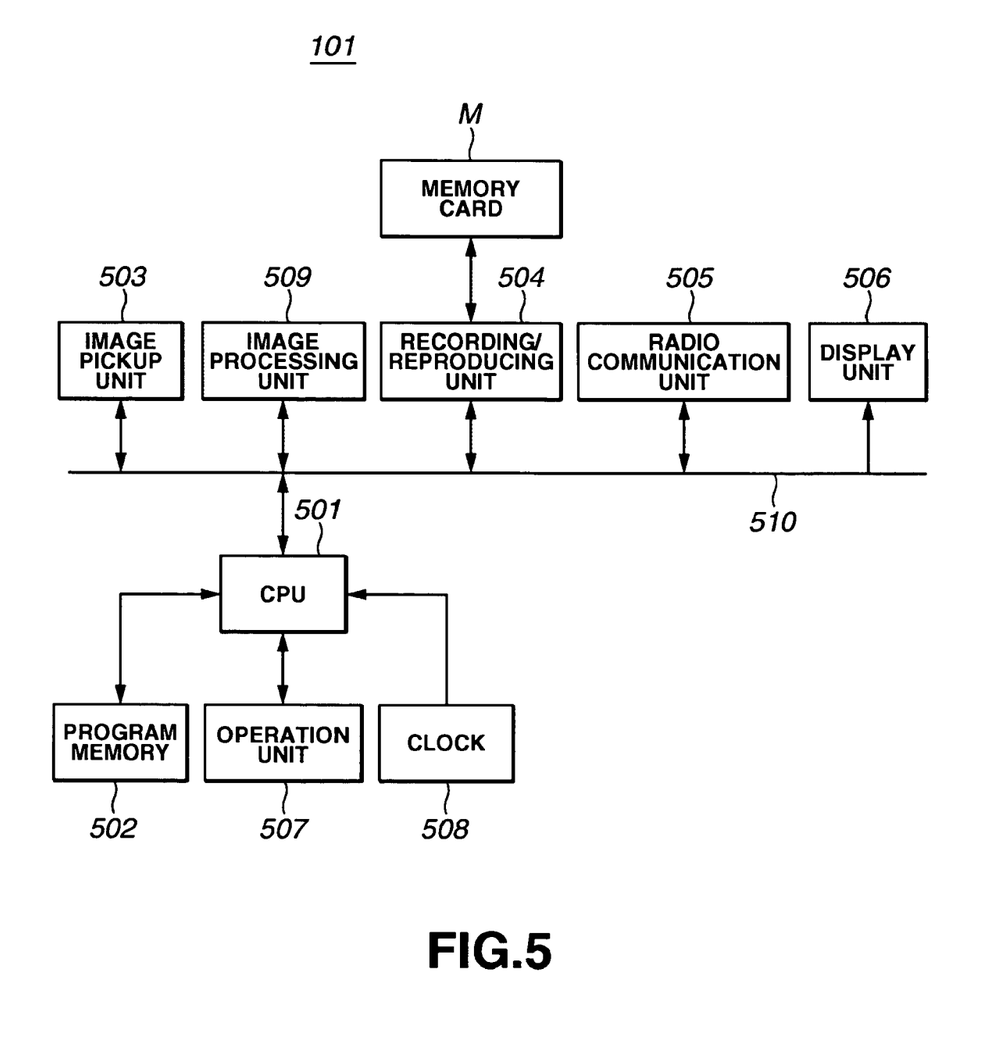
FIG. 5 is a schematic diagram illustrating the internal configuration of a camera.

FIG. 5 is a schematic diagram illustrating the internal configuration of the camera 101.

All operations in the camera 101 are controlled by a CPU (central processing unit) 501, and all internal devices are connected to the CPU 501 via a control bus/data bus 510. The CPU 510 operates in accordance with programs written in advance in a program memory 502. The CPU 501 performs a photographing operation by controlling an image pickup unit 503. The image pickup unit 503 includes a lens, a CCD (charge-coupled device), an image processing chip, and an image processing buffer memory. Photographed image data is subjected to compression encoding by an image processing unit 509, and resultant data is stored in a memory card M by a recording/reproducing unit 504. At that time, each body of image data (e.g., the data for one picture) is stored in the memory card M as a file, and information indicating the amount (size) of data of each file is also added to the image data (e.g., is added to the image data of that file).

The CPU 501 can perform communication with an external apparatus using a radio communication unit 505, and can also transmit image data stored in the memory card M in an encoded state. By operating an operation unit 507, the user provides the CPU 501 with an instruction to operate the camera 101. In the operation, an operation UI is displayed on a display unit 506.

The CPU 501 can obtain the current time using a clock 508, and records time information together with image data when recording the image data in the memory card M. According to this function, the CPU 501 can arrange recorded image data in the order of recording times.

The camera 101 operates by an incorporated battery, and the CPU 501 can perform an energy saving operation by interrupting power supply except for the CPU 501 itself, the operation unit 507 and the clock 508. It is also possible to perform an ordinary operation by releasing the energy saving operation at a start time set in the clock 508.

Figure 2:
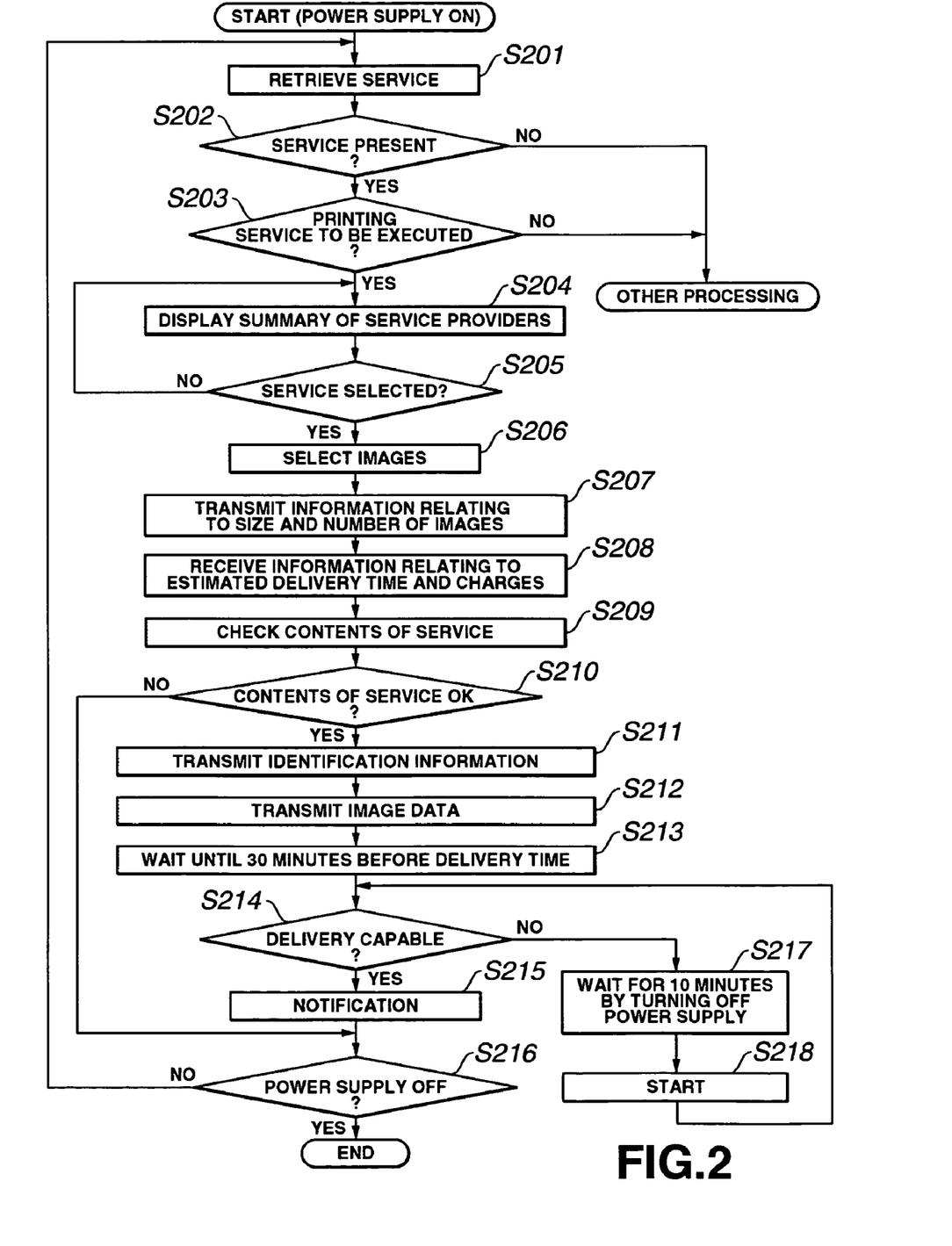
FIG. 2 is a flowchart illustrating an operation of the image printing service system shown in FIG. 1.

Next, an operation of the image printing service system shown in FIG. 1 will be described with reference to FIG. 2. FIG. 2 is a flowchart illustrating an operation of the image printing service system shown in FIG. 1.

When the user starts the camera 101 by operating the operation unit 507, the flow starts.

The CPU 501 retrieves image printing services that can be utilized within a range of communication, by operating the radio communication system 505 (step S201). The apparatus of each of image printing service providers constituting this system responds to the retrieval operation of the camera 101.

In FIG. 1, it is assumed that image printing service providing apparatus "printer #1" of print shop 1, image printing service providing apparatus "printer #2" of print shop 2, and image printing service providing apparatus "printer #3" of print shop 3 have responded.

As a result of retrieval, it is determined whether or not a printing service provider that can be utilized is present within the range of communication (step S202). If the result of the determination in step S202 is negative, since printing service utilizing radio communication cannot be provided in the current environment, other processing, such as an ordinary photographing operation, or the like, is executed.

If the result of the determination in step S202 is affirmative, the camera 101 displays a picture frame for confirming execution of printing service on the display unit 506. The user instructs whether or not printing service is to be executed through the operation unit 507 (step S203). If the result of instruction in step S203 is negative, other processing is executed.

Upon instruction of execution of printing service, the CPU 501 controls the radio communication unit 505 so as to ask a detected printing service providing apparatus to transmit information relating to waiting time for printing, charges for printing, and printing method used.

In FIG. 1, image printing service providing apparatus "printer #1" of print shop 1, image printing service providing apparatus "printer #2" of print shop 2, and image printing service providing apparatus "printer #3" of print shop 3 each transmit the following information relating to a waiting time for printing, charges for printing, and a printing method to the camera 101:

In print shop 1, a time to complete printing is 20 minutes for 36 pictures, charges per picture are 40 yen, and printing is performed according to a low-speed laser printing method.

In print shop 2, a time to complete printing is 20 minutes for 36 pictures, charges per picture are 30 yen, and printing is performed according to an ink-jet printing method.

In print shop 3, a time to complete printing is 5 minutes for 36 pictures, charges per picture are 50 yen, and printing is performed according to a high-speed laser printing method.

In this embodiment, it is assumed that the printing speed and the printing quality are superior in the order: high-speed laser printing, low-speed laser printing, and ink-jet printing.

Figure 3:
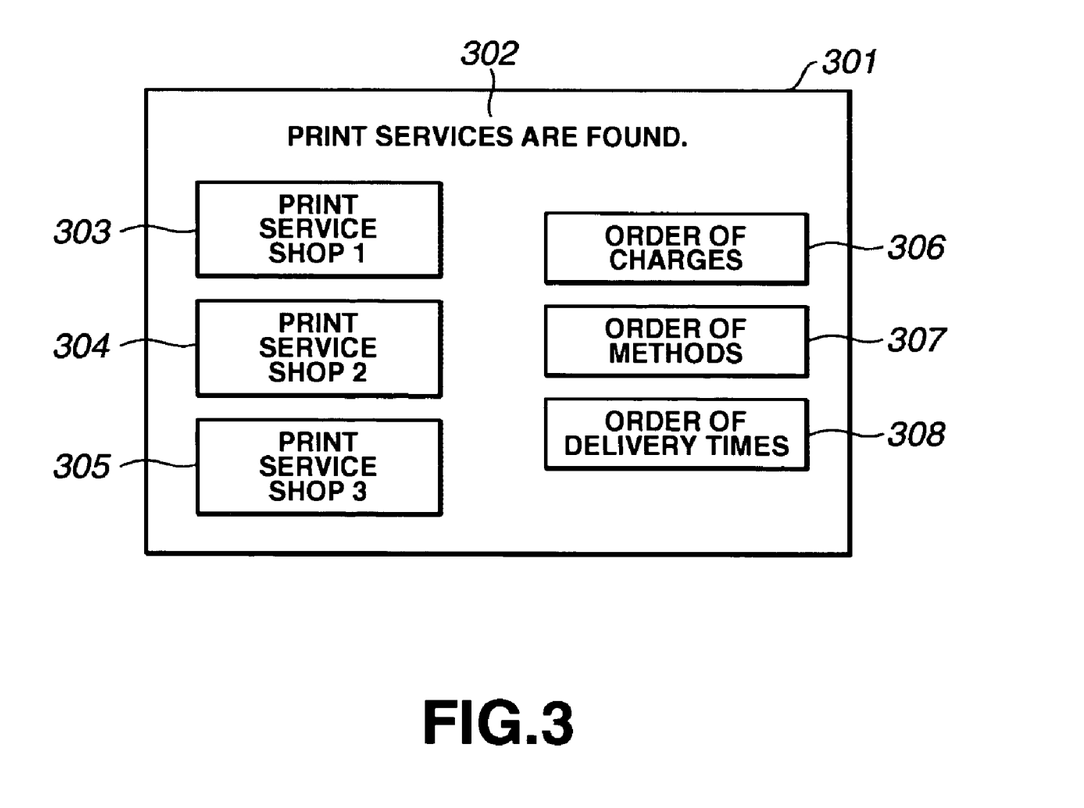
FIG. 3 is a diagram illustrating a service selection picture frame.

Upon reception of information from the respective printing service providers, the camera 101 displays a service selection picture frame shown in FIG. 3 on the display unit 506 (step S204). In FIG. 3, reference numeral 301 represents a display picture frame on the display unit 506, in which a message 302 "Print services are found" is displayed.

When the user selects display selection portions 306, 307 and 308 through the operation unit 507, display portions 303, 304 and 305 are vertically rearranged. When the order of charges 306 is selected in the display selection portion, the display portions 303, 304 and 305 are displayed in the order of print shop 2>print shop 1>print shop 3.

When the order of methods 307 is selected in the display selection portion, the display portions 303, 304 and 305 are displayed in the order of print shop 3>print shop 1>print shop 2.

When the order of delivery times 308 is selected in the display selection portion, the display portions 303, 304 and 305 are displayed in the order of print shop 3>print shop 1>print shop 2. According to the above-described arrangement display operation, the user can easily select a preferred printing service provider.

The user selects a desired printing service provider while watching such a summary picture frame of printing service providers (step S205). It is assumed that the user has selected print shop 1.

Then, the user selects images to be printed by the selected printing service provider (step S206). Image data to be selected is stored in the memory card M.

Figure 4:
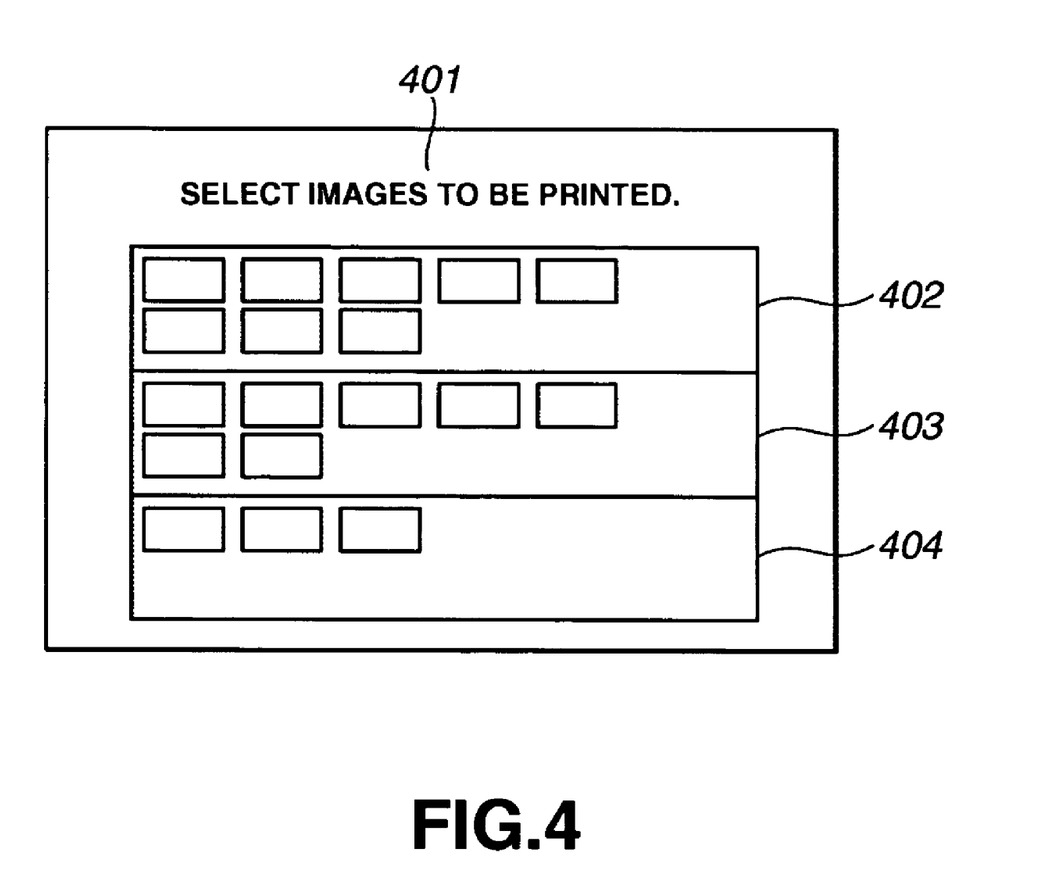
FIG. 4 is a diagram illustrating a picture frame for selecting images to be printed.

FIG. 4 illustrates a display picture frame on the display unit 506 of the camera 101 when selecting images to be printed.

On the display picture frame, a message 401 "Select images to be printed" is displayed. At the same time, reduced images (thumbnail images) of image data stored in the memory card M are arranged in the order of image recording times (photographing times). If the recording times of adjacent images are separated by at least 6 hours, corresponding images are displayed as separate groups. In the case of FIG. 4, three groups are present, i.e., image group 402 including 8 images, image group 403 including 7 images, and image group 404 including 3 images have photographing times separated by at least 6 hours.

In general, if there is a large photographing interval between adjacent images made using a camera, it is highly possible that these images have been taken at different photographing chances (times and places at which the user has decided to take one or more pictures), and in many cases, images to be printed belong to a respective image group for each photographing chance. Accordingly, it is assumed that the user selects image group 403 including 7 images through the operation unit 507.

The camera 101 transmits size information added to selected image data and information relating to the number of prints to the selected printing service provider, i.e., the image printing service providing apparatus of print shop 1 shown in FIG. 1 in this case (step S207).

The image printing service providing apparatus of print shop 1 calculates an estimated delivery time and charges from the size and the number of image data to be printed, and transmits such information to the camera 101. The radio communication unit 505 of the camera 101 receives the information relating to the estimated delivery time and charges, and notifies the CPU 501 of the received information (step S208).

It is assumed that data indicating a delivery time of 10 minutes and charges of 280 yen are received by the camera 101. The camera 101 displays the received estimated delivery time and charges on the display unit 506. The user checks the contents of service by viewing the contents of display (step S209). If, for example, clients utilizing the same printing service concentrate during a short time period, the service displayed in step S204 sometimes cannot be realized. The user checks the contents of the service, and if the displayed contents of the service are acceptable, the fact is input by operating the operation unit 507 (step S210).

When there is an indication to accept the contents of the service, the camera 101 transmits camera identification information recorded in advance in the memory card M or the program memory 502 to the image printing service providing apparatus of print shop 1 (step S211). The user's portrait image or a randomly generated digit sequence is transmitted as the identification information. When transmitting the user's portrait image, a clerk of print shop 1 can identify the user of the camera 101. The randomly generated digit sequence can be displayed by the user of the camera 101 on the display unit 506, and an operation of identifying the order provider can be performed by transmitting these numerals to a clerk of print shop 1.

Then, all image data selected in step S207 is transmitted to print shop 1 (step S212).

Then, the camera 101 waits by shifting to an energy saving operation until 30 minutes before the estimated delivery time (step S213). When the current time elapses 30 minutes before the estimated delivery time, the processing is caused to proceed.

The camera 101 asks if delivery can be effected by communicating with the image printing service providing apparatus of print shop 1 (step S214). By starting inquiry 30 minutes before the estimated delivery time instead of the exact estimated delivery time, the user can also deal with a case in which the delivery time advances. If the result of the inquiry in step S214 is negative, the camera 101 waits in an energy saving mode by turning off the main power supply (step S217). When ten minutes elapse after starting waiting, the camera 101 is again started, to ask if delivery can be effected (step S218).

If the estimated delivery time is long, there is the possibility that the user may have moved to a different location not near the image printing service provider. In such a case, even if the camera 101 performs a delivery asking operation, print shop 1 is not always within the range of radio communication. By staring inquiry 30 minutes before the estimated delivery time, it is possible to prevent an unnecessary inquiry operation and thus to reduce power consumption of the camera 101.

Although in this embodiment, inquiry is started 30 minutes before the estimated delivery time, the timing to start inquiry is not limited to 30 minutes, but may be appropriately changed. Although inquiry is performed periodically at every 10 minutes after the lapse of 30 minutes before the estimated delivery time, the interval is not limited to 10 minutes, but may have any other appropriate value.

If the result of the inquiry in step S214 is affirmative, the camera 101 notifies the display unit 506 that the delivery time is fulfilled. Notification may be performed by providing a buzzer, an LED (light-emitting diode), or the like in the camera 101, and ringing the buzzer or lighting the LED.

The user goes to print shop 1, and receives ordered image prints. When receiving the prints, the user shows a clerk of print shop 1 that he is the true order provider, according to the identification information transmitted in step S211. Charges are paid at the shop.

Then, the user turns off the power supply of the camera 101 (step S216), and the overall operation is terminated.

As described above, according to the image printing service system of this embodiment, the user utilizing image printing service can select one of a plurality of neighbor printing service providers based on the contents of services to be provided, so that the user can easily select and order a service without directly going to the shops of the plurality of service providers.

Since this image printing service system performs image transfer using radio communication means, the user need not deposit a recording medium with the printing service provider and can continue freely to use the recording medium from the time of ordering a print service to the time of receiving image prints.

Furthermore, when the user goes to the shop of the selected service provider in order to receive the image prints, he or she can easily provide proof of being the true order placer. Accordingly, in contrast to conventional services, the user can utilize a desired service without going to the shop of the service provider until it is time to receive image prints.

Since the camera of this embodiment can notify the user at the time for delivery of image prints, the user can exactly recognize when the prints are ready to be picked up, in contrast to conventional services. Accordingly, the user can receive image prints without wasting time.

According to the camera of this embodiment, since it is possible to retrieve image printing services every time the main power supply of the camera is turned on, or when executing a predetermined operation mode other than a photographing state, services are efficiently retrieved with reducing power consumption of the camera.

According to the camera of this embodiment, it is possible to receive the contents of the services provided by an image printing service providing apparatus by a radio communication apparatus, and performs arranged display in the order of estimated times of service delivery, charges, or printing method. Accordingly, when selecting one of a plurality of neighboring printing service providers, the user of the system can easily select a service based on information relating to the predicted time to delivery, charges for the service, and printing methods, without going to the shops of the plurality of service providers.

The camera of this embodiment selects images from the latest photographed image backward to older images, and a portion up to an image from which a photographing interval is separated by a predetermined time interval is made a range of selection of images to be printed. This operation aids the user's operation to select images to be printed from a plurality of images recorded in the camera.

Furthermore, the camera of this embodiment can transmit the user's portrait image recorded in the camera or data randomly generated in the camera as information for identifying the camera or the user. Accordingly, the user utilizing image printing service can identify himself as the order provider when receiving printed images from the shop of the selected provider. As a result, the user can utilize a service without going to the shop until the printed images are received, in contrast to conventional services.

Although in this embodiment, printing service providers present within a range of radio communication by the radio communication unit 506 of the camera 101 are retrieved, printing service providers may also be retrieved, for example, by utilizing a network.

The present invention may also be applied to a case in which, in order to operate various devices for realizing the functions of the above-described embodiment, program codes of software for realizing the functions of the embodiment are supplied to a computer within an apparatus or a system connected to the devices, and the devices are operated in accordance with a program stored in the computer (a CPU or an MPU (microprocessor unit)) of the system or the apparatus.

In this case, the program codes themselves of the software realize the functions of the above-described embodiment, so that the program codes themselves, or means for supplying the computer with the program codes, such as a recording medium storing the program codes, constitute the present invention. For example, a flexible disk, a hard disk, an optical disk, a magnetooptical disk, a CD (compact disc)-ROM (read-only memory), a magnetic tape, a nonvolatile memory card, a ROM, or the like, may be used as the recording medium storing the program codes.

The present invention may also be applied not only to a case in which the functions of the above-described embodiment are realized by executing supplied program codes by a computer, but also to a case in which the program codes realize the functions of the above-described embodiment in cooperation with an OS (operating system), other application software, or the like, operating in a computer.

The present invention may also be applied to a case in which, after storing supplied program codes in a memory provided in a function expanding board of a computer or a function expanding unit connected to the computer, a CPU, or the like, provided in the function expanding board or the function expanding unit performs a part or the entirety of actual processing based on instructions of the program codes, and the functions of the above-described embodiment are realized by the processing.

The individual components shown in outline or designated by blocks in the drawings are all well known in the image reproducing apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the appended claims is to be accorded the broadest interpretation so as to encompass all such modifications and equivalent structured and functions.

What is claimed is:

1. An imaging apparatus comprising:
   an imaging unit;
   a recording and reproducing unit configured to record image data obtained by the imaging unit in a recording medium and to reproduce the image data from the recording medium;
   a communication unit configured to communicate by radio communications;
   a controller configured to find one or more image printing service providers by operating the communication unit;
   a display unit configured to display information of the one or more image printing service providers found by operating the communications unit; and a selection unit configured to be employed in selecting one image printing service provider of the one or more image printing service providers found by operating the communications unit among the information displayed by the display unit, wherein the controller controls the communication unit to transmit image data recorded in the recording medium to the image printing service provider selected by the selection unit to cause the image data recorded in the recording medium to be printed;

an acquisition unit configured to acquire information of an estimated delivery time of printed matter based on the image data generated by the image printing service provider selected by the selection unit;

a detection unit configured to detect that the image printing service provider selected by the selection unit has finished generating the printed matter after the communication unit has transmitted the image data to the image printing service provider selected by the selection unit; and a notification unit, wherein if the detection unit detects that the image printing service provider selected by the selection unit has finished generating the printed matter before the estimated delivery time acquired by the acquisition unit, the controller controls the notification unit to notify a user that the printed matter can be delivered, wherein the controller controls the communication unit to transmit an inquiry inquiring whether the image printing service provider has finished generating the printed matter to the image printing service provider selected by the selection unit before the estimated delivery time, and the detecting unit detects that the image printing service provider has finished generating the printed matter based on a response from the image printing service provider selected by the selection unit, and wherein the controller controls the communication unit to automatically transmit the inquiry to the image printing service provider selected by the selection unit again after a predetermined period if the detection unit does not detect that the image printing service provider has finished generating the printed matter based on the response.

2. The imaging apparatus according to claim 1, wherein the notification unit notifies that the printed matter can be delivered by displaying information indicating that the printed matter can be delivered on the display unit.

3. An imaging apparatus comprising:
an imaging unit;
a recording and reproducing unit configured to record image data obtained by the imaging unit in a recording medium and to reproduce the image data from the recording medium;
a communication unit configured to communicate by radio communications;
a controller configured to transmit the image data recoded in the recording medium and an order for printed matter concerning the image data to a printing service provider by operating the communication unit;
an acquisition unit configured to acquire information of an estimated delivery time of the printed matter based on the image data generated by the printing service provider;
a detection unit configured to detect that the printing service provider has finished generating the printed matter after the communication unit has transmitted the order to the printing service provider; and
a notification unit,
wherein, if the detection unit detects that the printing service provider has finished generating the printed matter before the estimated delivery time acquired by the acquisition unit, the controller controls the notification unit to notify a user that the printed matter can be delivered,
wherein the controller controls the communication unit to transmit an inquiry inquiring whether the printing service provider has finished generating the printed matter to the printing service provider before the estimated delivery time, and the detecting unit detects that the image printing service provider has finished generating the printed matter based on a response from the printing service provider, and
wherein the controller controls the communication unit to automatically transmit the inquiry to the printing service provider again after a predetermined period if the detection unit does not detect that the printing service provider has finished generating the printed matter based on the response.

4. The imaging apparatus according to claim 3, wherein the notification unit notifies the user that the printed matter can be delivered by outputting to the display device information indicating that the printed matter can be delivered.

* * * * *